UNITED STATES PATENT OFFICE.

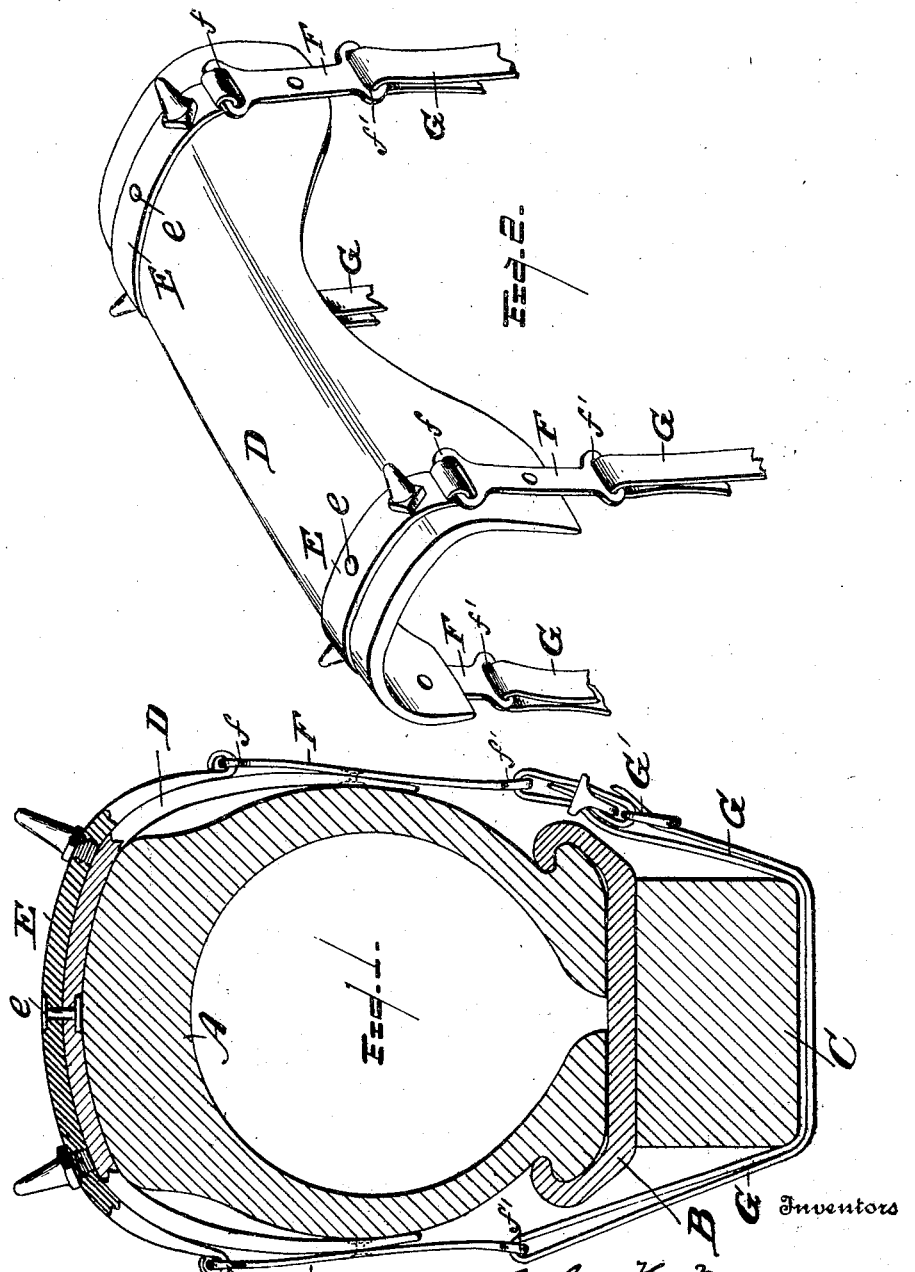

JOHN H. MYRES AND LEWIS D. SNOVER, OF WATERFORD, MICHIGAN.

ANTISKIDDING DEVICE FOR VEHICLE-TIRES.

1,203,243.     Specification of Letters Patent.     Patented Oct. 31, 1916.

Application filed February 28, 1916. Serial No. 80,776.

*To all whom it may concern:*

Be it known that we, JOHN H. MYRES and LEWIS D. SNOVER, citizens of the United States, residing at Waterford, county of Oakland, State of Michigan, have invented a certain new and useful Improvement in Antiskidding Devices for Vehicle-Tires, and declare the following to be a full, clear, and exact description of the same, such as will enable others skilled in the art to which it pertains to make and use the same, reference being had to the accompanying drawings, which form a part of this specification.

Our invention relates to anti-skidding devices for vehicle tires, shown in the accompanying drawings and more particularly set forth in the following specification and claim.

Our invention has for its object a device which may be readily attached to or removed from the wheel of a vehicle, and which consists essentially of an outer shoe conforming to the contour of a tire having calks projecting from its tread adapted to prevent skidding by affording greater traction.

Another object is to provide removable calks, in order that they may be replaced when worn; thus prolonging the life of the device.

Another feature of the invention consists in arranging the calks so as to project at an angle to the tread of the tire and toward the sides of the wheel, thereby offering greater resistance to side or lateral slippage.

Another object of the invention is to eliminate the wear upon the tire common to devices of this character, the construction being such that it is not only adapted to insure the wheel against skidding, but may serve as a shoe to protect the tire or casing when injured.

Another object of the invention is to provide means whereby the device may be quickly applied to the tire, and when not required, it may be readily removed.

Other advantages and improvements will hereafter appear.

In the drawings accompanying this specification:—Figure 1 is a cross sectional view through the outer casing of a pneumatic tire, the felly and rim of a wheel, showing the device secured thereto, with a portion broken away and in section to more clearly disclose its construction. Fig. 2 is a perspective view of the device, and indicating a fragment of the holding straps connected therewith.

Referring now to the letters of reference placed upon the drawings:—A, denotes the outer casing of a pneumatic tire; B, a supporting rim.

C, indicates the felly of a wheel.

D, is a shoe formed of leather, rubber, or other suitable material overlapping the sides and tread of the tire.

E, denotes transverse metallic straps riveted at *e*, to the shoe and substantially conforming to the cross sectional contour of the tire.

F, F, indicate metallic strips or links, also riveted to the shoe and provided with eyes *f*, to receive the ends of the metallic straps E, with which they articulate.

G, G, denote flexible straps engaging the looped ends *f'*, of the strips F.

G', is a suitable buckle carried by the respective straps to receive and engage the end of the straps overlapping the wheel felly, whereby the device is secured in position.

Having indicated the several parts of the device by reference letters, its construction and operation will be readily understood.

The shoe E, which may be made of leather, rubber, or other suitable fabric, is shaped to conform to the cross sectional contour of the tire, and may be used to cover a "blow-out" or other rupture of the tire when necessary, and when used for this purpose, the calks may be removed if desired.

It will be observed that the removable calks are preferably positioned quite near the sides of the shoe, *i. e.,* those portions overlapping the tire laterally. Upon the calks becoming worn through use, they may be removed to be replaced by new calks, or the calks may be removed and the shoe used without, if the condition of the road is such as to make their use unnecessary.

Having thus described our invention, what we claim is:—

A device adaptable to a wheel-tire, including a shoe conforming to the periphery thereof, and having applied transversely thereon metallic straps, said metallic straps having articulated thereto metallic links, said links being riveted at their mid lengths, to said shoe, near its lower lateral edges, and means for connecting said links to the wheel-felly and rim.

In testimony whereof, we sign this specification in the presence of two witnesses.

JOHN H. MYRES.
LEWIS D. SNOVER.

Witnesses:
SAMUEL E. THOMAS,
LAURA DUFF.